Figure 1:
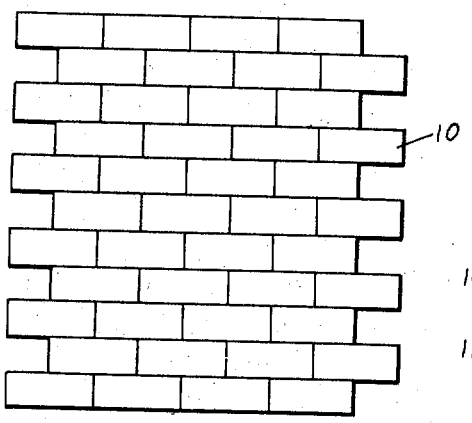

G. W. WARMOTH.

WOOD BLOCK PAVING.

APPLICATION FILED JUNE 17, 1921.

Reissued Nov. 29, 1921.

15,240.

3 SHEETS—SHEET 1.

Inventor

GEORGE W. WARMOTH.

By Lockwood & Lockwood

Attorneys.

G. W. WARMOTH.

WOOD BLOCK PAVING.

APPLICATION FILED JUNE 17, 1921.

Reissued Nov. 29, 1921.

15,240.

3 SHEETS—SHEET 2.

Inventor

GEORGE W. WARMOTH.

By Fostwood & Fostwood

Attorneys.

G. W. WARMOTH.

WOOD BLOCK PAVING.

APPLICATION FILED JUNE 17, 1921.

Reissued Nov. 29, 1921.

15,240.

3 SHEETS—SHEET 3.

Inventor

GEORGE W. WARMOTH.

By

Attorneys.

UNITED STATES PATENT OFFICE.

GEORGE W. WARMOTH, OF INDIANAPOLIS, INDIANA.

WOOD-BLOCK PAVING.

15,240. Specification of Reissued Letters Patent. Reissued Nov. 29, 1921.

Original No. 1,351,546, dated August 31, 1920, Serial No. 256,850, filed October 4, 1918. Application for reissue filed June 17, 1921. Serial No. 478,397.

*To all whom it may concern:*

Be it known that I, GEORGE W. WARMOTH, a citizen of the United States, residing at Indianapolis, in the county of Marion and State of Indiana, have invented a new and useful Wood-Block Paving; and I do hereby declare that the following is a full, clear, and exact description thereof, reference being had to the accompanying drawings, in which like numerals refer to like parts.

The object of this invention is to provide an improved system of making and laying block pavements or flooring and the like, by forming the blocks into sheets or sections, preferably in the factory, and then laying and uniting the sheets or sections to form the pavement or flooring.

One of the objects of the invention is to make a wooden block pavement or flooring in which the blocks are not separate or individual, but are secured by suitable means firmly to each other, and thus overcome the defects of individual block pavements or flooring. It is well known that pavements made of single blocks laid side by side, will buckle or heave after a rain and the pavement become defective and often dangerous, where blocks buckle up sometimes a foot or two high and for long distances. Treating individual blocks with wood preservative does not always prevent the buckling from moisture because it is difficult to fill all the cells of all the blocks with such material and, therefore, it is difficult to prevent moisture from entering the cells and expanding the blocks.

While there is trouble in individual block pavements from expansion, there is also trouble in individual block flooring in rooms and factories subject to considerable or abnormal heat. The use of wooden blocks for flooring in factories, warehouses and other large structures is becoming very general throughout the country and when the blocks contract, the floor becomes loose and the blocks rattle and often turn under use or traffic.

One feature of the invention consists in uniting all of the blocks forming a pavement or flooring, by suitable metal connecting bars, strips or the like, so that the pavement or flooring will be one sheet, like a sheet of linoleum. This will prevent any individual block from becoming loose or any abnormal spaces to occur between blocks and it will also permit the pavement or flooring to be laid without the blocks being so close together as to prevent them expanding without widening or lengthening the pavement or flooring, and also permit the pavement or flooring to be laid abutting the same tightly against the curb stones or other fixed lateral walls or the like. Therefore, the pavement or flooring can be laid with space between the lateral edges thereof and the side wall or curbing, so that the pavement or flooring will have ample room for expansion without buckling or heaving.

Another feature of the invention is to form the blocks into sections or sheets at the factory, instead of shipping and handling the blocks individually. Thus, sections or sheets three feet square may be formed by uniting the blocks with metal strips so that they can be treated with greater facility in wood preserving plants.

Pavement and flooring made of sections or sheets, as herein set forth, can be removed or replaced for opening or repairing the street for any reason, more easily than the separate wooden blocks. An entire section can be cut out and removed as a unit, instead of removing a large number of separate blocks. Since there can be no disarrangement of blocks in a pavement or flooring, they will be less liable to be injured from water or moisture and also will wear longer than the single blocks. In laying a pavement or flooring, the same number of laborers can lay about three times the yardage that they can with the separate blocks.

Another advantage is that much less yard room is required for storing blocks in sheets than when the blocks are loose.

Also when the blocks dry and contract, the pavement as a sheet or whole contracts so as to maintain the proper closed relation between the adjacent blocks and prevent any cracks or gaps, as are often seen in individual block pavements. Furthermore, the sections are flexible transversely of the street, bridge or like place where they are laid which enables them to conform to the crown of the roadway or to any like irregularity of surface, where depressions are required.

The full nature of the invention will be understood from the accompanying drawings and the following description and claims.

Figure 2:
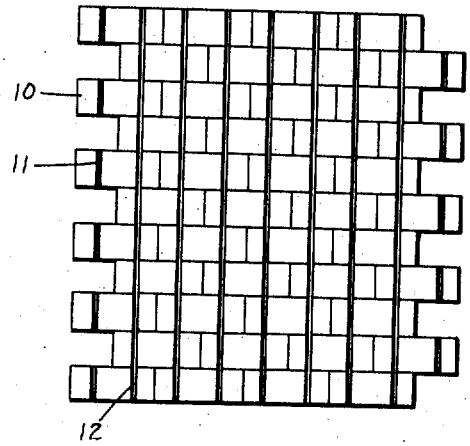
Figure 3:
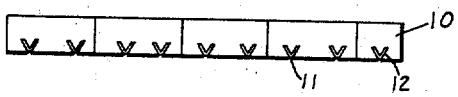
Figure 4:
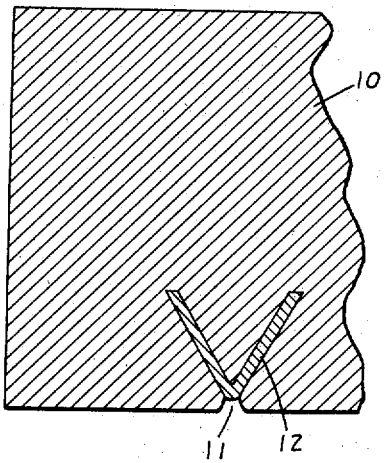
Figure 5:
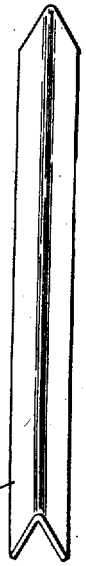
Figure 6:
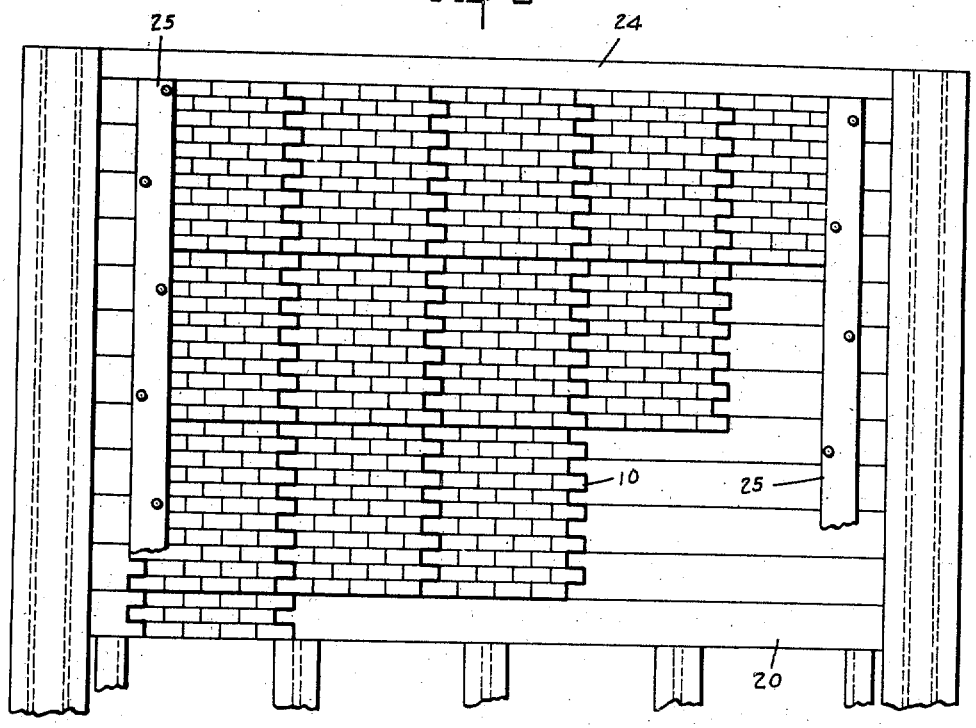
Figure 7:
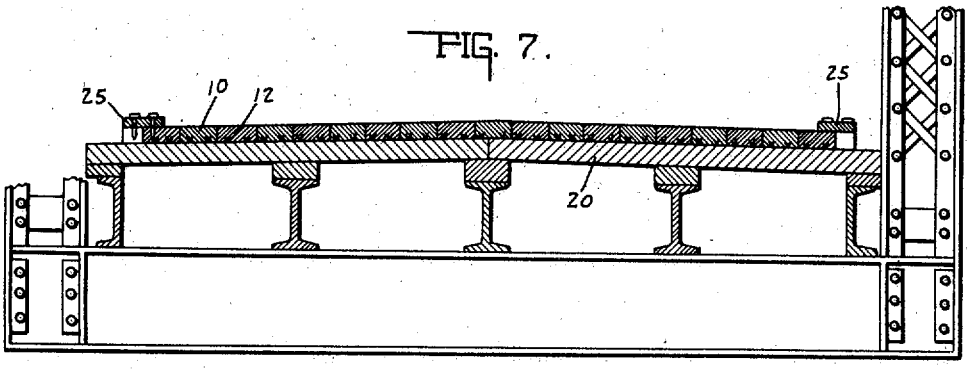
Figure 8:
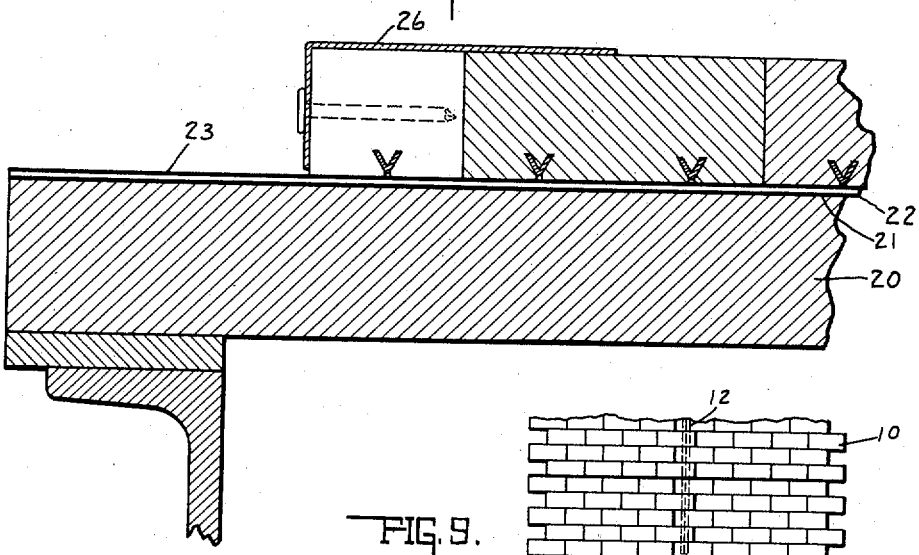
Figure 9:
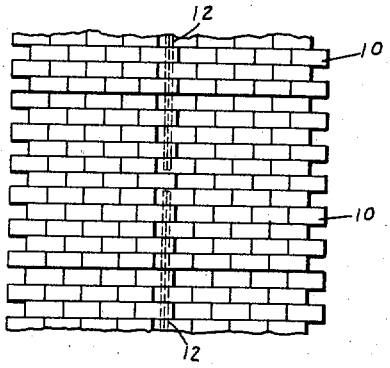
Figure 10:
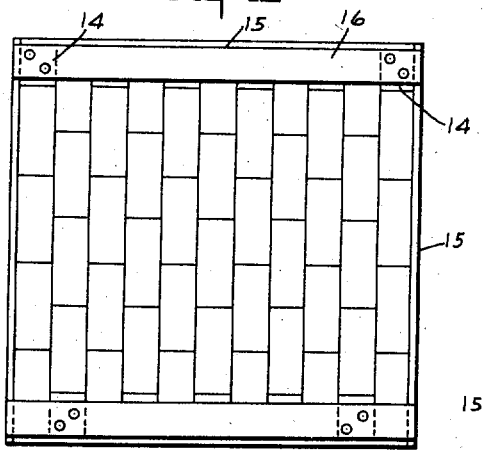
Figure 11:
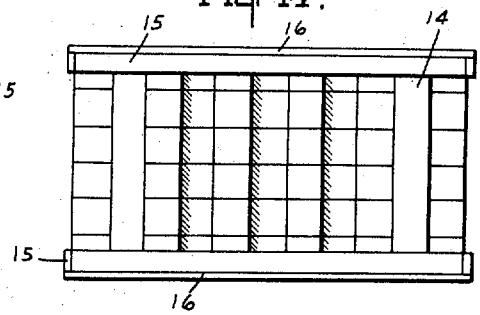

In the drawings, Figure 1 is a plan view of a typical section or sheet of pavement or flooring made according to this invention. Fig. 2 is a bottom view of the section shown in Fig. 1. Fig. 3 is an end elevation of Fig. 1. Fig. 4 is a vertical section through a portion of one block on a large scale, the remaining portion of the block being broken away. Fig. 5 is a perspective view of the connecting metal strip shown in Figs. 2, 3 and 4. Fig. 6 is a plan view of a portion of a bridge partially covered with said improved block pavement, parts being omitted and parts being broken away for clearness. Fig. 7 is a transverse vertical section through said bridge, parts being broken away. Fig. 8 is a vertical section through a portion of said bridge on a large scale, but having a modified form of side guard. Fig. 9 is a plan view of a portion of the flooring on said bridge showing the manner of uniting the sections together in dotted lines. Fig. 10 is a plan view of a crate of paving sections. Fig. 11 is a side elevation of such crate.

The blocks 10 used in forming the pavement or flooring herein described are of the usual dimensions and character of wood and may be treated in any desired way to reduce their water absorbing power and increase their life, so far as this invention is concerned. The individual blocks are provided with kerfs 11 or other passageways, preferably along the bottom sides thereof, equi-distant from the ends of the blocks so that the blocks can be placed side by side in staggered position, as shown in Fig. 1, and then metal strips or tie bars 12, of the same form as the kerfs or passageways, are inserted transversely through the entire number of blocks forming the section. The metal strip or tie bar 12 may be of any form in cross section that is desired, but that shown herein is V-shaped, being sheet metal cut V-shape in cross section. The position of said metal strip in the block is shown in Fig. 4, and in the series of blocks forming the section, in Fig. 3, and particularly in Fig. 2 where the bottom side of the section or sheet appears. It is noted that on both sides of the section or sheet the alternate blocks extend for half the length beyond the adjacent blocks, leaving spaces between them, and that the number of laterally extending blocks on the left-hand side is one more than on the right-hand side, while the number of spaces or recesses on the left-hand side is one less than on the right-hand side. This is to enable the sections or sheets to be joined together with interlocking pins in order to form the pavement or flooring into one continuous sheet. When a section is thus formed, there is, as shown in Fig. 2, a row of kerfs 11 in the laterally extending blocks at each side in which there is no metal strip or bar 12 placed while manufacturing the sections or sheets in the factory. The tie bars are omitted from those kerfs in the manufacture so as to enable the sections or sheets to be interlocked with each other when laid.

It is seen that these sections or sheets of wooden blocks, when united and made in the factories, as explained, can be readily handled and stored in small spaces in the ware house or car and easily transported in wagons from the car to the place where the same are to be laid. But for shipment, they are preferably crated, as shown in Figs. 10 and 11. As seen in Fig. 11, there are six sections or sheets laid, one upon the other. When thus laid, the recesses between the projecting blocks on two sides thereof will register with each other or be in vertical rows so that wooden bars 14 may be temporarily inserted in those recesses and near the four corners of the pile, and then side boards 15 and 16 may be nailed to those vertical bars 14 to protect the corners and projecting edges of the pile of block sections.

The sections or sheets of blocks are laid, as illustrated in Fig. 6, interlocking with each other, and may be laid upon any suitable foundation for paving a street or flooring a factory, or upon planking 20 on a bridge, as shown in Figs. 6 and 7. As the sections are being laid, they are united by inserting metal tie bars 12 through the interlocking blocks at the edges of the sections, as shown in Fig. 9. Thus, when two blocks are laid in interlocking position, a bar 12 is inserted, but only for about half its length so that the remaining half will project outwardly and can be inserted in the adjacent sections or sheets. Thus these tie bars introduced while the pavement is being laid, not only secure together interlocking blocks on the right and left hand sides, but also secure together the sections longitudinally of the bridge or pavement. Therefore, the entire pavement, or flooring, when laid, is united together, every block and every section, so that it constitutes one entire sheet.

In the bridge herein shown, a layer of pitch 21 is spread over the planking 20 and tar paper 22 is then spread upon the pitch, and the sheet of tar paper is covered with a layer 23 of pitch and the blocks are laid upon this last layer of pitch. But these layers of pitch and tar paper constitute no part of this invention, as the blocks may be laid upon any material desired.

In forming the sections or sheets in the factory by uniting them together with the metal strips 11, they are not placed tight against each other, but are spaced slightly away from each other, so that the blocks will have room for expansion longitudinally of the metal strips. This enables the flooring of a bridge, for instance, to be placed tightly against the end guards or headers 24 so as to make a smooth approach. It also permits a close abutment of a pavement at the ends of any section of the street being paved to render the pavement at that point smooth. But there will be lateral or transverse expansion of the pavement or flooring. Yet since the pavement or flooring is of one sheet, it is unnecessary to build the pavement or flooring tightly against the curbing of the street or tightly against the walls in a building or tightly against any felly guard in a bridge. Space can be left at each side of the pavement or flooring for it to expand freely. Thus, with this invention the trouble of both longitudinal and lateral expansion are overcome. This is illustrated in Fig. 7, where the block flooring does not extend to the lateral edges of the planking 20, but there is left some room for lateral expansion of the flooring.

In bridge constructions heretofore, it has been customary to place the side guards or longitudinal side boards 25 at the lateral edges of the bridge and secure them rigidly to the planking 20 and abut the wooden blocks against the side guards, but this prevented any opportunity for the blocks to have lateral expansion. With this invention the side guards 25 are secured instead, to the flooring or pavement itself, that is, to the blocks, as shown in Figs. 6 and 7, so that they move with the flooring or pavement as it expands or contracts.

A modified form of side guard is shown in Fig. 8, where a strip of metal or angle iron 26 is used instead of the wooden boards 25 shown in Fig. 6, and the angle iron 26 is secured to the blocks so as to move with the same as the pavement or flooring expands or contracts.

The invention is not limited to the particular forms and constructions herein shown which are given here merely for the purpose of illustrating the nature of the invention and some of the objects and advantages of its use.

The invention claimed is:

1. A pavement or flooring formed of rows of blocks, each row comprising a plurality of blocks adjacent each other, each block having a plurality of transversely extending and angularly disposed kerfs cut in the under side thereof so as to join at the bottom, the kerfs in the adjacent rows of blocks registering with each other, and strips angular in cross section inserted in said kerfs for securing the blocks together as a pavement.

2. Pavement or flooring formed of sections of blocks, each section consisting of a number of blocks secured together adjacent each other, alternate blocks in the lateral edges of each section projecting beyond the adjacent blocks whereby the sections can be interlocked when laid, and means insertible transversely through the interlocking projecting portions of the sections for securing the sections together.

3. Pavement or flooring formed of sections of blocks, each section consisting of a number of blocks adjacent each other with transversely extending kerfs cut in the underside thereof and extending upwardly at an angle to each other, V-shaped in cross section so that the kerfs in the blocks will be in alinement with each other and the alternate blocks in the lateral edges of each section will project beyond the adjacent blocks whereby the section will be interlocked when laid, cross sectional V-shaped metal strips insertible in said kerfs for securing the blocks together in each section, and similar metal strips insertible in the interlocking projecting portions of the blocks of the sections for securing the sections together.

4. Pavement or flooring formed of sections of blocks, each section consisting of a number of blocks adjacent each other having transversely extending kerfs cut in the underside thereof and extending upwardly at an angle to each other, V-shaped in cross section so that the kerfs in the blocks of the section will be in alinement with each other, and the kerfs in the adjacent sections will also be in alinement with each other, and cross sectional V-shaped metal strips insertible in said kerfs for securing the blocks together into sections and for also uniting the sections.

5. A wooden structure comprising a plurality of members mounted adjacent each other, each member having two angularly disposed kerfs cut in the underside thereof and intermediate the ends, said kerfs being joined at the bottom and extending upwardly and outwardly at an angle to each other, and a metallic strip bent longitudinally of its center whereby the sides thereof will extend upwardly and outwardly at an angle to each other and into each kerf through adjacent members for securing them rigidly together.

In witness whereof, I have hereunto set my hand at the city of Indianapolis, county of Marion and State of Indiana, this 23rd day of May, 1921.

GEORGE W. WARMOTH.